No. 845,535. PATENTED FEB. 26, 1907.
N. G. DEVLIN.
BOOT FOR HORSES.
APPLICATION FILED NOV. 3, 1905.

WITNESSES
E. M. Campbell.
H. G. Campbell

INVENTOR
Norman Gilchrist Devlin
per Alexander Campbell
ATTORNEY

UNITED STATES PATENT OFFICE.

NORMAN GILCHRIST DEVLIN, OF PERTH, ONTARIO, CANADA.

BOOT FOR HORSES.

No. 845,535.  Specification of Letters Patent.  Patented Feb. 26, 1907.

Application filed November 3, 1905. Serial No. 285,792.

*To all whom it may concern:*

Be it known that I, NORMAN GILCHRIST DEVLIN, a subject of the King of Great Britain, residing at Perth, in the county of Lanark, in the Province of Ontario and Dominion of Canada, have invented a new and useful Improvement in Boots for Horses, of which the following is a specification.

My invention relates to improvements in boots for horses which are capable of being adjusted to fit the foot of any size horse.

The objects of the invention are to provide a boot which may be easily placed over the shoe and secured to the hoof to hold the same in close contact with it. The boot is intended to replace the method of treating horses' hoofs to keep them soft at present in use, which consists of placing a trough full of soft clay in the stall for the horse to stand in, and the other methods for holding poultices, &c., in place in the hoof, at the same time allowing the animal the full use of the feet. I attain these objects by the mechanism illustrated in the accompanying drawings, of which—

Figure 1:
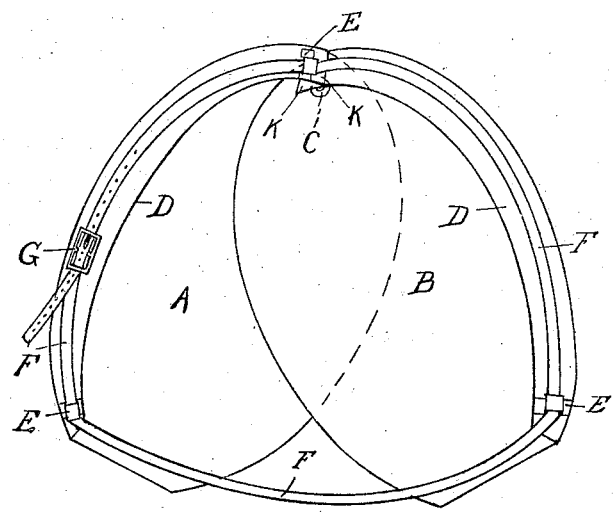
Figure 2:
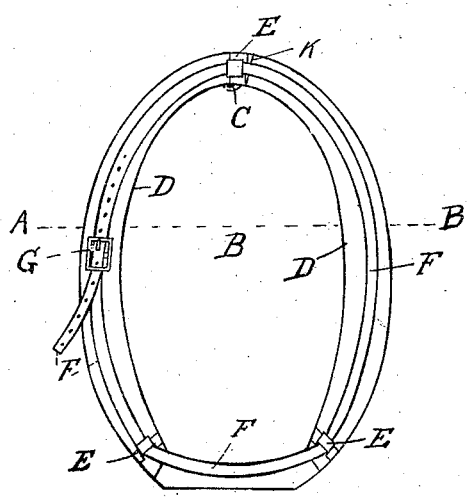
Figure 3:
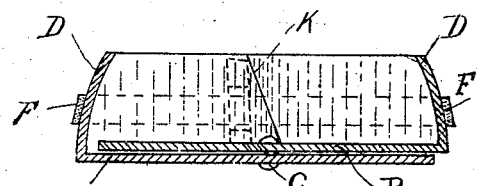

Figure 1 is a plan view of the boot opened. Fig. 2 is a plan view showing the boot closed. Fig. 3 is a cross-sectional view on the line A B, Fig. 2.

Similar letters refer to similar points throughout the several views.

The essential feature of my invention is in making the boot in two parts, pivoted near one end, so that they may be adjusted relatively to accommodate any size hoof. The boots are constructed with rims curved to fit the curvature of the hoof and are retained in closed position by means of an adjustable fastener. A and B represent the two sections of my improved boot, which are pivoted at C. Each part is approximately the shape of the horse's foot and has a rim D on its outer edge. These rims slightly overlap adjacent the pivotal point, and their upper edges are curved inward to tightly fit the hoof and are provided at various points with guides E to hold the strap F in place. This strap F surrounds both sections of the boot and is tightened in place by a buckle G. The front ends K K of the rims D overlap and form when closed on the hoof a continuous rim. The rear ends of the rim are cut short, so that they do not meet, as a steel rim would cut into the fetlock when applied.

To keep the poultice from squeezing through the open space at the back, I prefer to use a piece of leather, (not shown,) which fits inside the boot and is curved up to fill the space and is provided with a slot to receive the adjusting-straps, or I may secure laps of a flexible material to the ends of the rim and allow the same to overlap when placed in position.

In practice the hoof is filled with soft clay, linseed, or other preparations, and the strap on the boot is loosened, allowing the same to open wide enough to surround the hoof and be pressed up against the shoe, the leather piece being previously inserted in the boot. The strap is then tightened up, drawing the rims in tightly to fit the curvature of the hoof. By using this boot it is very easy to attend to the horse's feet without having to tie him with his feet in a trough, and as the boots are preferably made of steel, or steel leather-covered, they are not damaged by the horse walking in them.

I claim as my invention and desire to secure by Letters Patent—

1. A boot for horses comprising two sections each having a flat surface with an upwardly and inwardly extending flange secured thereon, arranged to overlap each other at the front of the boot, means for pivotally securing the said sections together with the said flanges forming a continuous flange, at the front, and an open space at the rear of the boot, and means for securing the sections in their adjusted position, substantially as described.

2. In a boot for horses, two sections pivotally secured to one another, the said sections being comprised of flat surfaces with upwardly and inwardly extending flanges, arranged to overlap at the front of the boot adjacent the pivotal point, and to leave an open space at the rear of the said boot means for securing the said sections in their adjusted positions and independent means for closing the opening formed by the flanges, substantially as described.

3. In a boot for horses, two sections pivotally secured to one another, the said sections being comprised of flat surfaces with upwardly and inwardly extending flanges arranged to overlap at the front of the boot adjacent the pivotal point, and to leave an open space at the rear of the said boot, means for securing the said sections in their adjusted positions and independent means held in position by the securing device for closing the opening formed by the flanges, substantially as described.

4. In a boot for horses, two sections pivotally secured to one another, the said sections being comprised of flat surfaces, with upwardly and inwardly extending flanges arranged to overlap at the front of the boot, adjacent the pivotal point, and to leave an open space at the rear of the said boot, means for securing the said sections in their adjusted position and independent resilient means for closing the opening formed by the flanges, substantially as described.

In witness to the foregoing specification this 17th day of October, 1905.

NORMAN GILCHRIST DEVLIN.

Witnesses:
  HENRY TAYLOR,
  GEO. W. ROGERS.